Oct. 25, 1938.    E. ROIRANT    2,134,342
MACHINE FOR THE MANUFACTURE OF BLOWN GLASS ARTICLES OF GREAT CAPACITY
Filed Jan. 2, 1936    5 Sheets-Sheet 2

Oct. 25, 1938.  E. ROIRANT  2,134,342
MACHINE FOR THE MANUFACTURE OF BLOWN GLASS ARTICLES OF GREAT CAPACITY
Filed Jan. 2, 1936  5 Sheets-Sheet 4

E. Roirant
INVENTOR
By: Glascock Downing Seibold
Attys.

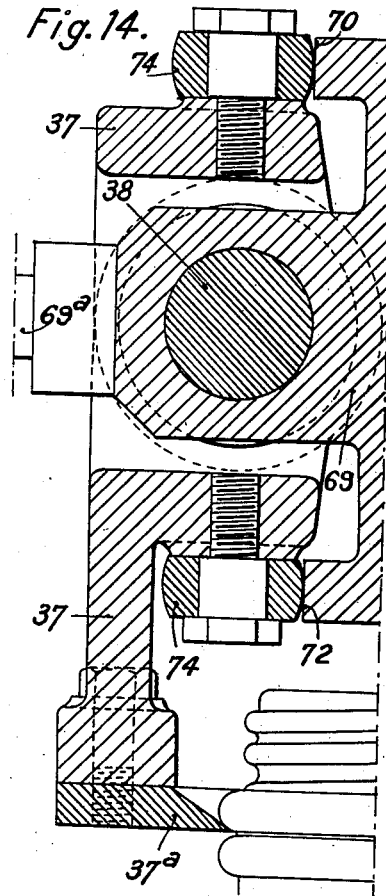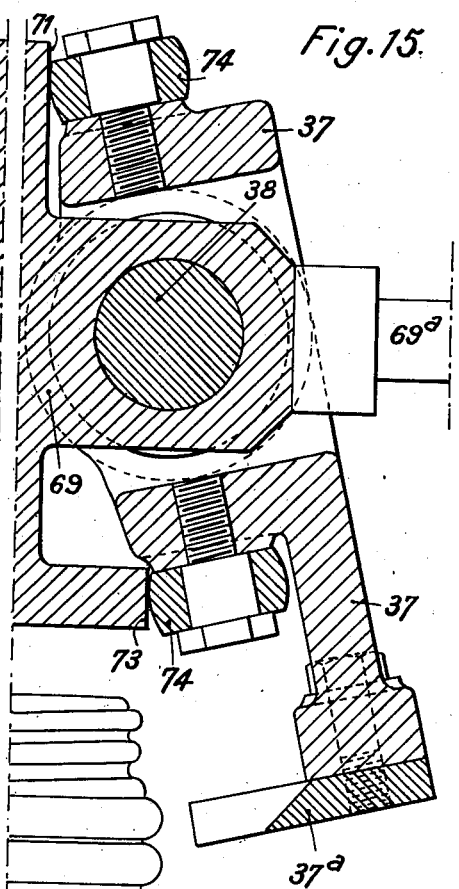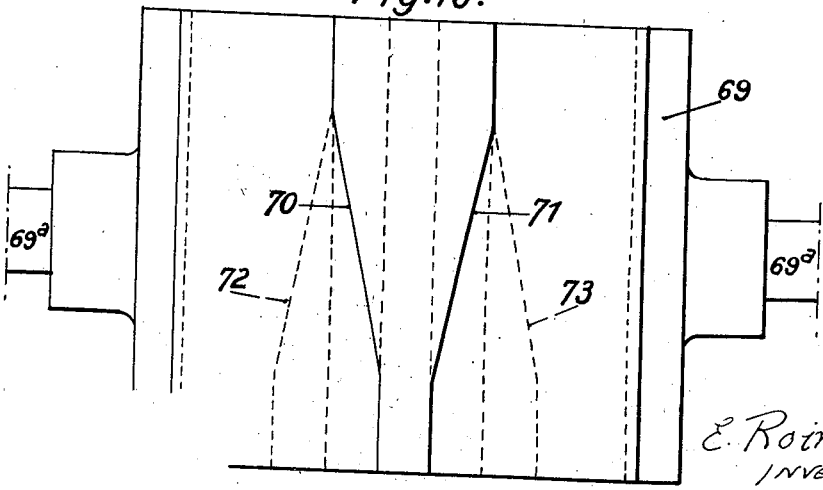

Patented Oct. 25, 1938

2,134,342

UNITED STATES PATENT OFFICE 2,134,342

MACHINE FOR THE MANUFACTURE OF BLOWN GLASS ARTICLES OF GREAT CAPACITY

Emile Roirant, Paris, France, assignor to Societe Anonyme d'Etudes et de Constructions d'Appareils Mecaniques pour la Verrerie, Paris, France Application January 2, 1936, Serial No. 57,263
In France April 18, 1935

20 Claims. (Cl. 49—5)

This invention relates to a machine for the manufacture of articles of great capacity and made of blown glass, such as carboys and the like.

For manufacturing such articles, it has already been proposed to use machines similar, but of larger dimensions, to those employed for the manufacture of bottles, but practice shows that, beyond a certain capacity, approximating 10 litres, the use of such machines is impossible. In fact, no machine exists capable of normally manufacturing vessels of greater capacity. Said vessels are still manufactured by hand.

The main reasons which, for the manufacture of vessels of great capacity, render impossible the use of means employed for the manufacture of bottles can be summed up as follows:

By comparing a bottle and a carboy of average capacity and average weight, viz: 0 litre 500 and 0 kg. 500 in one case and 30 litres and 5 kgs. in the other, it is found that the ratios between weight and capacity are totally different. In fact, this ratio is 1:1 in the first case, and 1:6 in the second case. Consequently, in the case of the carboy, the extension of the glass, when blowing the parison, is much more important than in the case of the bottle.

For taking place in satisfactory conditions, this extension would necessitate such a homogeneity of the temperature of the glass of the parison that it would be practically impossible to obtain it.

In another respect, the comparison of the natural heating up of the finishing moulds by contact with glass is also very instructive.

By comparing the above mentioned articles, it is found that the 500 grams of glass of the bottle normally heat up a mould weighing about 10 kgs., that is to say a ratio of $$\frac{0.5}{10} = 1 \text{ to } 20$$

The 5 kgs. of glass of the carboy are in presence of a mould which does not weigh less than 200 kgs., that is to say a ratio of 1 to 40.

At the same rate of manufacture (and that of the manufacture of carboys is certainly lower), it would be necessary, for obtaining the same thermal conditions, to artificially heat the carboy moulds to a very high temperature.

On the other hand, if the heating up of the parison or blank moulds (which enclose a solid mass of glass) is compared, it is found that the surface of the glass is about five times greater in the case of the carboy, whereas the mass of glass and, consequently, the quantity of calories is ten times greater. This causes a much more important heating up of the parison moulds of the carboys. Whereas it is already necessary to considerably cool the parison molds of bottle-making machines, it would not be possible, by the usual means, to sufficiently cool those of carboy-making machines.

It is these anomalies which prevent the application of the classical means employed in the manufacture of bottles, to the manufacture, much more difficult, of carboys.

The machine forming the subject-matter of the present invention is so devised as to re-establish the indispensable conditions necessary for the mechanical manufacture of bottles and which must be respected every time it is desired to apply the known principle of the transformation of a mass of glass into a hollow blown article.

For avoiding the difficulties above mentioned concerning the thermal conditions, the said machine comprises a plurality of parison or blank moulds successively supplying with glass the same finishing mould or the same preliminary mould when carboys of large capacity are under consideration.

This feature allows:

On the one hand, of reducing the frequency of use of each of the parison moulds, and of thus reducing the degree of their heating up whilst facilitating their artificial cooling during the time they are inactive.

On the other hand, of multiplying the passage of the parisons in the finishing mould and, consequently, of heating this mould to a higher degree without intervention of special means and whilst increasing the importance of the production of the said mould.

For avoiding the difficulty of blowing a parison the weight of which is disproportionate to the capacity, the machine will preferably be provided with an intermediate mould (preparatory mould) between the parison mould and the finishing mould, so as to proceed in steps to the delicate extension of the parison.

But these features alone could not find a practical application if the glass taken from a parison mould was caused to pass from this mould into the intermediate or finishing mould as rapidly as this is done in bottle-making machines.

Masses of glass from 3 to 10 kgs. are not treated as rapidly as masses from 300 grams to 1 kg. Conductibility of glass is a factor independent of the mass, and a time relatively proportional to this mass is required in order that the glass, liquid at the moment it is taken, has sufficiently cooled and has imparted to the finished article a sufficient rigidity for allowing its manipulation.

It is the reason why, according to another feature of the machine, the glass taken from the parison mould will pass from station to station where it will have the time to be subjected to a progressive cooling, at the same time as successive blowing operations of the parison will facilitate the final blowing which is the most delicate.

In the machine illustrated by way of example in the drawing, the parison moulds are two in number and the finishing mould is preceded by a preparatory mould, but it is obvious that the number of the parison moulds might be greater, and that the preparatory mould might be dispensed with and replaced by the final mould, without the general principle of operation being altered.

It is to be noted that the parison moulds take glass by suction. This implies that the parisons will always remain in a vertical plane and that gravity will not cause them to be distorted during the intentionally long path they will have to follow until their final transformation.

Finally, these parison moulds, arranged around a vertical column, receive an intermittent movement of rotation.

The following description clearly indicates all these characteristic features of construction and operation.

In the accompanying drawings:

Figs. 14, 15 and 16 illustrate the device for controlling grippers acting for grasping and transferring the blanks.

Figure 1:
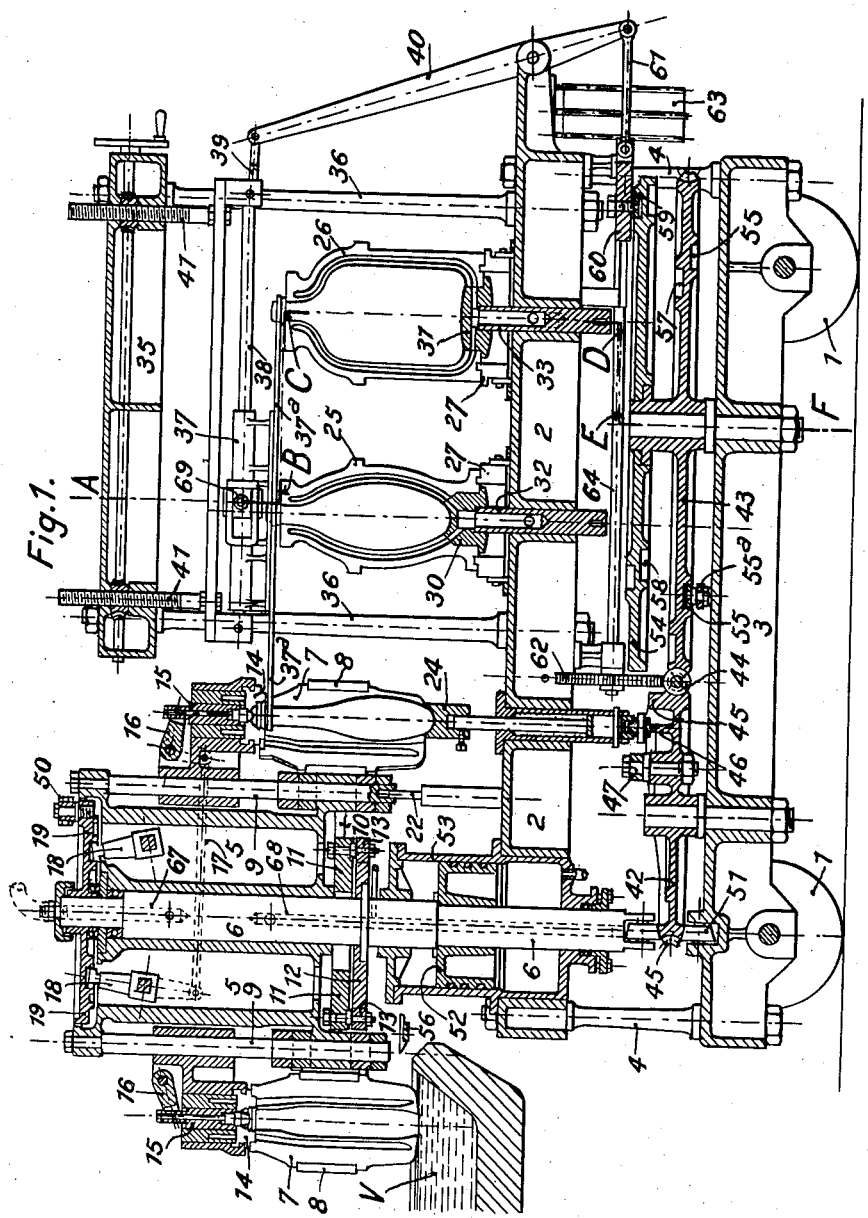
Fig. 1 is an axial vertical sectional view of the machine.
Figure 2:
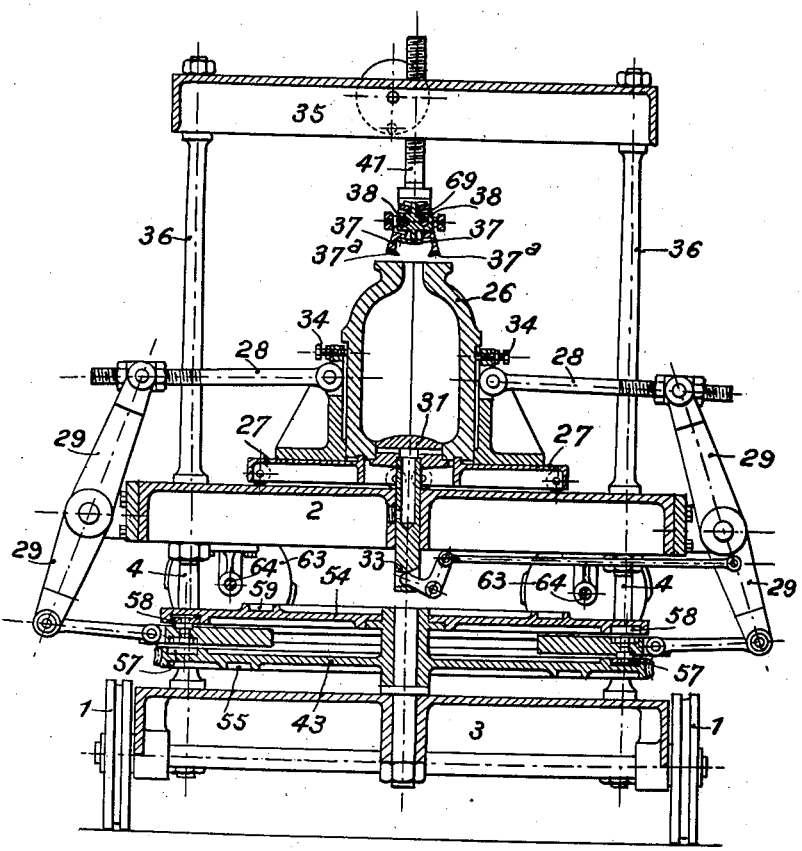
Fig. 2 is a cross section made according to broken line A B C D E F of Fig. 1.

The machine is composed of three main parts:

(1) The frame mounted on wheels 1 and composed of two platforms 2 and 3 connected by pillars 4.

(2) The driving mechanism enclosed between the platforms 2 and 3 and constituted by cam discs receiving a continuous movement of rotation.

(3) The driven elements comprising the moulds and their supports and their various accessory members and the whole of which is arranged on the upper part of platform 2.

In the example chosen, the parison moulds are two in number; they are arranged diametrically opposite each other and are carried by a frame 5 pivoting about a vertical column 6 receiving an up and down movement.

The parison moulds 7, formed of two opening shells, rest on mould-carriers 8 pivoted about a pivot 9. Links 10 connect these mould-carriers to a carriage 11 sliding on the rotary frame 5 and receiving a rectilinear movement from a cam 12 secured on the column 6.

Figure 12:
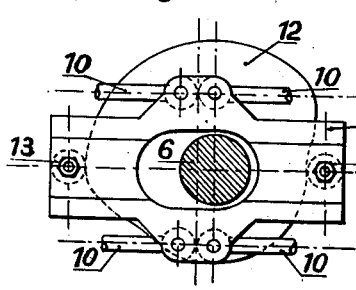
Figure 13:
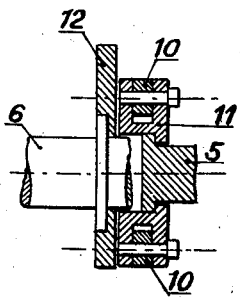

For that purpose, rollers 13 secured on carriage 11 constantly bear against the raceway of cam 12 (Figs. 1, 12 and 13).

It results therefrom that the moulds are opened or closed simply by the rotation of frame 5 about column 6. One opens when the other closes.

Above each of the parison moulds 7 is arranged a ring mould 14 opening and closing rectilinearly. The support of the ring moulds 14 is secured, on pivot 9, in a position adjustable in function of the height of the parison mould.

A plunger-holder 15 is actuated by a bell crank lever 16 through the medium of a link 17 and a cam lever 18.

Figure 11:
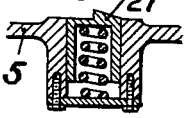

A disc 19, provided with a cam groove, is arranged on the vertical pillar 6 and is independent of the rotating frame 5; this disc 19 controls the plunger and the ring mould and carries four teeth 20 capable of engaging, two by two, with spring pawls 21 (Fig. 11) diametrically arranged on the frame 5.

It will be understood that this disc 19 thus receives a rotary oscillating movement and that it drives, in a single direction, the rotating frame 5.

In the example chosen, this movement has an amplitude of 90°, so that the parison moulds effect ¼ of a revolution every time the teeth engage with the pawls 21.

The rotations of the frame take place when the parison moulds are lifted, and the disc 19 returns to its initial position without driving the frame when these moulds are lowered.

Pins 22, in which the pivots 9 successively engage upon downward movement of the rotating frame 5, hold the latter stationary upon each return movement of disc 19.

A bottom 23, resiliently mounted on platform 2, is arranged at the first station where each parison mould stops after it has been filled up.

A second bottom 24, arranged at the second station, receives an up and down movement at certain convenient movements.

The preparatory mould 25 and the final mould 26 are formed of two shells mounted in an identical manner on carriages 27 provided with rollers. These carriages receive rectilinear movements which move them towards or away from each other so as to close or open the moulds. The carriage on which the finishing mould rests consists of two parts, each forming a carriage per se.

Links 28 and levers 29, arranged on either side of the platform constitute the transmission members.

The base of each of the moulds 25 and 26 is obturated by bottom moulds 30 and 31 secured on the end of hollow rods 32 and 33 receiving, at the required moments, a vertical movement.

The moulds are simply placed on the carriages 27 and receive the closing stress at a single point through the medium of an adjustable screw 34.

A plate 35, carried by pillars 36, is arranged above the finishing moulds and covers them. This plate serves as a support for a gripper device adapted to grasp blanks and the carboy after final blowing and to rectilinearly transfer them from one mould to another and from the last mould to the exterior of the machine.

This device is composed of a double carriage 37 sliding on two parallel shafts 38.

Each of the carriages 37 carries blades 37ᵃ acting as grippers; these grippers receive an opening and closing movement. The movement of translation is ensured by links 39 and levers 40. The gripping blades 37ᵃ move, open, towards the center of rotation of the parison mould, they stop and simultaneously close about the neck portion of the blank hung from the ring mould and on the ring of each of the articles enclosed in moulds 25 and 26. When these latter are opened, the translation of the articles grasped takes place in the reverse direction for the purpose indicated above.

For obtaining these various movements (Figs. 1 and 14 to 16), the links 39 are respectively coupled to two knobs 69ª rigid with a slide-block 69 which, sliding on the parallel shafts 38, within the double carriage 37, 37, can receive, relatively to the latter, a relative movement of translation in one direction or the other and, at the end of this movement, can cause the axial movement of the carriages in one direction or the other.

The slide-block 69 is provided with two pairs of inclines 70—71 at its upper part, and 72—73 at its lower part. These inclines serve as tracks or raceways for rollers 74 capable of rotating on pins carried by the carriages 37.

Figs. 14 and 15 respectively illustrate one of the carriages in position for closing the grippers, the other in position for opening said grippers, and it is to be understood that, for both carriages, the opening and closing movements simultaneously take place on either side of the axis of the mechanism.

It will easily be seen that the opening and closing movements take place during the relative displacement of the slide-block within the carriages, and that the axial displacement of these carriages carrying the grippers is effected from the moment the slide-block engages, on one side or the other, with the bottom of the carriages.

The entire gripping device is hung from the plate 35 by means of two screw-threaded rods 41 which allow the vertical adjustment of this device.

The driving mechanism, which is enclosed between the platforms 2 and 3, is essentially composed of two discs 42 and 43 provided with helical teeth and meshing with the same worm 44, which will directly receive a movement of rotation from an electric motor not shown in the drawings.

The disc 42 carries two cam races 45 and 46, respectively serving to ensure the up and down movement of pillar 6 and that of the bottom 24.

A crank pin 47 and a connecting rod 47ª originate the to-and-fro movement of the pawl disc 19 through the medium of levers 48 secured on a shaft 49 and of a Cardan link 50.

A roller 51 receives the reaction of the lifting stress of the parison unit the weight of which is partly balanced by compressed air by means of a piston 52 and cylinder 53.

The other disc 43, provided with helical teeth, is surmounted by a disc 54 on which it is secured.

Both discs are each provided with two cam-grooves.

The cam-groove 55 controls, through usual members 55ª, the shears 56 which cut the glass at the base of the parison mould after filling up and lifting movement of the latter.

The cam-groove 57 controls the half-shells of the intermediate and finishing moulds arranged on one and the same side of the platform 2.

The cam-groove 58 controls the other half-shells.

Finally, the cam-groove 59, through the medium of a carriage 60 and of a connecting rod 61, controls the gripping device and the translation of the grippers.

Two worm wheels 62 are actuated by the worm 44; said worm wheels are symmetrically arranged relatively to the longitudinal axis of the machine and transmit their rotation, by means of shafts 64, to two drums 63, arranged at the rear of the machine.

These drums 63 are each provided with inclines adjustable in position and respectively acting on valve boxes 65 and 66.

The valve box 65 is in communication with a vacuum apparatus, whilst the valve box 66 is an communication with compressed air.

The valve box 65 controls the suction of the glass in the parison mould and the suction in the finishing moulds, as it is to be noted that it is the process of blowing by vacuum which is employed in this machine.

The valve box 66 allows of blowing in the parison at the required moments. The piping is not illustrated in the drawings for greater clearness of the latter, but it is easy to imagine the arrangement of said piping by noting that the valve box 65, acting for suction, is in communication with a conduit 67 provided in pillar 6 and with each of the bottom-carriers 32 and 33, whilst the valve box 66 (blowing) is in communication with a conduit 68 also provided in pillar 6.

The conduits 67 and 68 are respectively in communication with the ring mould-carriers and, consequently, with the parison moulds, by means of flexible pipes (not shown).

The operation of the machine will be clearly understood from the foregoing description.

Figure 4:
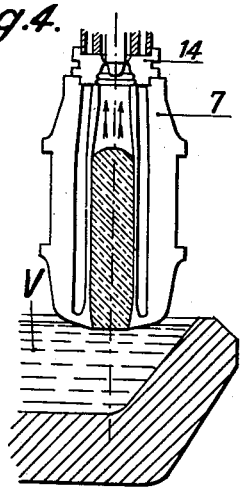
Figs. 4 to 8 are sections showing the various moulds with their contents during the various stages of the manufacture.

The parison moulds are shown in their lower position in Fig. 1. The parison mould which is lowered into the glass bath V, sucks the glass (see also Fig. 4). The evolutions of this mould in the course of its cycle will be seen hereinafter.

Figure 3:
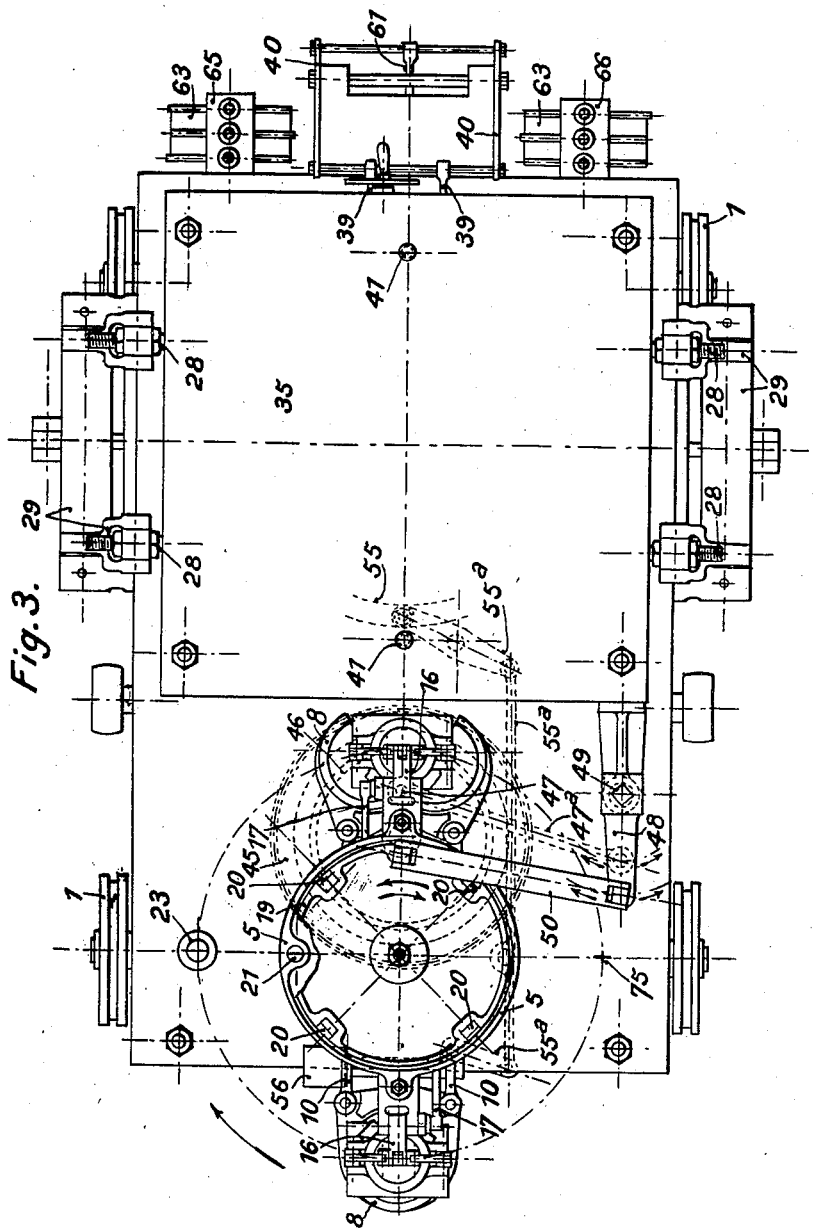
Fig. 3 is a simplified underside plan view, the finishing mould and the preparatory mould being removed.
Figure 5:
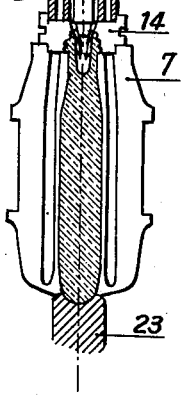

After filling up, the rotating frame 5 and, consequently, the parison mould, rise, and after the glass has been cut by the shears 56, it effects a rotation of 90°; it then lowers and the parison mould comes to rest against the bottom 23 (Figs. 3 and 5). The plunger 15 rises, compressed air rushes into the chamber or space formed by the plunger and presses the glass against the walls of the mould and against those of bottom 23. A first blowing of the parison is thus effected.

Figure 6:
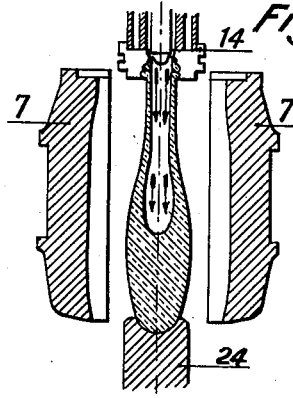

Then, the parison mould is again lifted and again rotates to the extent of 90° for bringing the parison to the third station (Figs. 3 and 6), where it lowers; at the same time, the bottom 24 rises and supports it. It will be noted that, during the rotation, the parison mould has opened under the action of the cam 12, whereas the parison remains hung from the ring mould.

At this third station, a supplementary blowing is effected and slightly swells the parison. Then, the gripping device 37ª grasps said parison; at the same time, the bottom 24 lowers and the ring mould opens.

The parison, then hung from the grippers, effects a movement of translation until it enters the preparatory mould 25, which is then open; simultaneously, the rotating frame 5 has risen and has begun a further rotation of 90°.

The other parison mould (which was at 180° from that the cycle of which has just been followed), has sucked a batch of glass and will effect in its turn the operations which have just been described.

However, the parison mould, which has just delivered its parison to the grippers, is brought, open, to the fourth station 75, that is to say at 90° from its preceding stop, whilst the other parison mould is at the station shown in Fig. 5.

During these stoppages at 23 and at 75, both parison moulds are cooled by means of air admitted in fixed nozzles (not shown in the drawings).

Figure 7:
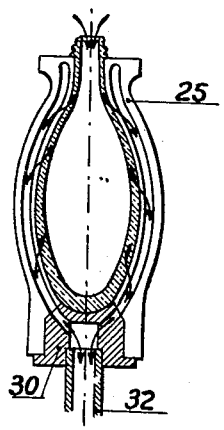

Resuming the cycle of the parison hung from the grippers, the latter is stopped at the center of the preparatory mould 25. The latter then closes about said parison and, at the same time, the bottom 30 rises and obturates said mould (Fig. 7).

By means of the valve box 65, the blowing of the blank is effected at the required moment, while the grippers 37ª have already released the neck portion of this blank and are ready to effect a translation in the reverse direction. This translation will take place when the second parison mould, having left in its turn the station shown in Fig. 5, will have brought another parison above the bottom 24.

Figure 8:
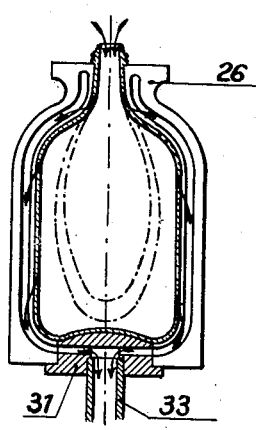
Figure 9:
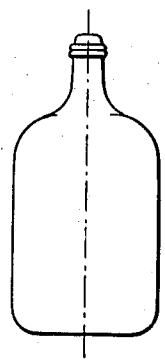
Fig. 9 is an elevation of a finished carboy.
Figure 10:
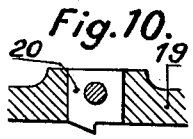
Figs. 10 to 13 illustrate separately the detail of certain groups of members acting for determining the operation of the parison moulds.

It suffices to take up again the cycle already described to see that, this time, not only the parison but also the blank issued from the preparatory mould 25 are grasped by the grippers 37—37ª and transported, so that, simultaneously, the new parison can be enclosed in the preparatory mould 25 and the blank, issued from the latter, enclosed in the final mould 26 where it will be subjected to its last transformation (Fig. 8).

From this moment, the machine is in complete action, as, during the next cycle, not only the parison and blank, but also the finished article will be grasped by the grippers, and the three different articles will simultaneously effect a displacement which will release the finished article and will allow the transformations of the two other articles to take place.

During the same time, the glass will be taken in the parison mould, whilst the parison enclosed in the other mould is subjected to a preliminary blowing operation.

It results therefrom that, for ensuring the manufacture of a single article, the glass is simultaneously enclosed in three different moulds 7, 25, 26 (Figs. 5 to 8) and that it is successively subjected to five transformations (Figs. 4 to 8) before being brought to its final shape.

What I claim as my invention and desire to secure by Letters Patent is:—

1. A machine for the manufacture of hollow glass articles of large capacity, comprising a plurality of parison moulds receiving an intermittent movement of rotation about one and the same vertical axis, said parison moulds drawing the glass by suction and cooperating successively for delivering parisons to a single finishing mould.

2. A machine for the manufacture of hollow glass articles of large capacity, comprising a plurality of parison moulds receiving intermittent movements of rotation about one and the same vertical axis, said parison moulds taking glass by suction and successively acting together for distributing parisons to a single preparatory mould, in which these parisons are blown in the form of blanks, a single finishing mould receiving said blanks from the preparatory mould.

3. In a machine of the type described, means for causing each of the parison moulds to successively occupy a position in line with the preparatory mould and the finishing mould.

4. In a machine of the type described, a single conveyor simultaneously grasping the blank issued from the parison mould, that coming from the preparatory mould and the article finished in the final mould, and effecting a rectilinear movement for transferring the blanks from one mould to the other and ejecting the finished article.

5. A machine for the manufacture of hollow glass articles of large capacity, comprising a plurality of parison moulds receiving intermittent movements of rotation about one and the same vertical axis, said parison moulds taking glass by suction and successively acting together for distributing parisons to a single finishing mould, means for lifting and lowering the whole of the parison moulds, respectively before and after each period of rotation.

6. A machine for the manufacture of hollow glass articles of large capacity, comprising a plurality of parison moulds receiving intermittent movements of rotation about one and the same vertical axis, said parison moulds taking glass by suction and successively acting for distributing parisons to a single finishing mould, independent bottom moulds on which the lower portion of each parison is formed and cooled upon each stoppage of the parison moulds.

7. A machine for the manufacture of hollow glass articles of large capacity, comprising a plurality of parison moulds receiving intermittent movements of rotation about one and the same vertical axis, said parison moulds taking glass by suction and successively acting for distributing parisons to a single preparatory mould, in which these parisons are blown in the form of blanks, a single finishing mould receiving said blanks from the preparatory mould and, independent bottom moulds on which the lower portion of each parison is formed and cooled upon each stoppage of the parison moulds.

8. A machine for the manufacture of hollow glass articles of large capacity, comprising a plurality of parison moulds receiving intermittent movements of rotation about one and the same vertical axis, said parison moulds taking glass by suction and successively acting for distributing parisons to a single finishing mould, independent bottom moulds on which the lower portion of each parison is formed and cooled upon each stoppage of the parison moulds, some of these bottom moulds being fixed, the others receiving intermittent vertical reciprocating movements, and means ensuring that the periods of stoppage of the movable bottom moulds are in determined relation with the periods of stoppage of the parison moulds intermittently rotating.

9. A machine for the manufacture of hollow glass articles of great capacity, comprising a plurality of parison moulds receiving intermittent movements of rotation about one and the same vertical axis, said parison moulds taking glass by suction and successively acting for distributing parisons to a single preparatory mould, in which these parisons are blown in the form of blanks, a single finishing mould receiving said blanks from the preparatory mould, independent bottom moulds on which the lower portion of each parison is formed and cooled upon each stoppage of the parison moulds, some of these bottom moulds being fixed, others receiving intermittent vertical reciprocating movements, and means ensuring that the periods of stoppage of the movable bottom moulds are in determined relation with the periods of stoppage of the intermittently rotating parison moulds.

10. A machine for the manufacture of hollow glass articles of great capacity, comprising a plurality of parison moulds receiving intermittent movements of rotation about one and the same vertical axis, said parison moulds taking glass by suction and successively acting for distributing parisons to a single finishing mould, and means effecting a first blowing of the parisons in the parison moulds.

11. A machine for the manufacture of hollow glass articles of great capacity, comprising a plurality of parison moulds receiving intermittent movements of rotation about one and the same vertical axis, said parison moulds taking glass by suction and successively acting for distributing parisons to a single preparatory mould, in which these parisons are blown in the form of blanks, a single finishing mould receiving said blanks from the preparatory mould, and means effecting a first blowing of the parisons in the parison moulds.

12. A machine for the manufacture of hollow glass articles of great capacity, comprising a plurality of parison moulds receiving intermittent movements of rotation about one and the same vertical axis, said parison moulds taking glass by suction and successively acting for distributing parisons to a single finishing mould, and means effecting a blowing of each parison, released from the parison moulds, at the stop station preceding the introduction of this parison into the finishing mould.

13. A machine for the manufacture of hollow glass articles of great capacity, comprising a plurality of parison moulds receiving intermittent movements of rotation about one and the same vertical axis, said parison moulds taking glass by suction and successively acting for distributing parisons to a single preparatory mould, in which these parisons are blown in the form of blanks, a single finishing mould receiving said blanks from the preparatory mould, and means effecting a blowing of each parison, released from the parison moulds, at the stop station preceding the introduction of this parison into the preparatory mould.

14. A machine for the manufacture of hollow glass articles of great capacity, comprising a plurality of parison moulds receiving intermittent movements of rotation about one and the same vertical axis, said parison moulds taking glass by suction and successively acting for distributing parisons to a single finishing mould, ring moulds respectively asociated with each of the parison moulds, means acting for releasing each parison from its parison mould and leaving it hung from its ring mould at the stop station which precedes the introduction of this parison into the finishing mould, and means for effecting a blowing of said parison thus hung.

15. A machine for the manufacture of hollow glass articles of great capacity, comprising a plurality of parison moulds receiving intermittent movements of rotation about one and the same vertical axis, said parison moulds taking glass by suction and successively acting for distributing parisons to a single preparatory mould, in which these parisons are blown in the form of blanks, a single finishing mould receiving said blanks from the preparatory mould, ring moulds respectively associated with each of the parison moulds, means acting for releasing each parison from its intermediate mould and leaving it hung from its ring mould at the stop station which precedes the introduction of this parison into the preparatory mould, and means for effecting a blowing of said parison thus hung.

16. In a machine of the type described, a single conveyor which simultaneously grasps the blank issued from the parison mould, that coming from the preparatory mould and the article finished in the final mould, and effects a rectilinear movement for transferring the blanks from one mould to the other and ejecting the finished article, a driving member for imparting a reciprocating movement to said conveyor, gripping members carried by this conveyor, and means for imparting to these gripping members an automatic opening and closing movement according to the direction of displacement of said driving member.

17. In a machine of the type described, a single conveyor which simultaneously grasps the blank issued from the parison moulds, that coming from the preparatory mould and the article finished in the final mould and effects a rectilinear movement for transferring the blanks from one mould to the other and ejecting the finished article, a driving member for imparting a reciprocating movement to said conveyor, gripping members carried by this conveyor, carriages provided with rollers and carrying said gripping members, a slide-block receiving the driving action and having a reciprocating movement and means causing, on the one hand, the relative displacement of the slide block and of the carriage to open and close said gripping members and on the other hand the engagement of the slide rock and of the curve to actuate the carriages.

18. A machine for the manufacture of hollow glass articles of great capacity, comprising a plurality of parison moulds receiving intermittent movements of rotation about one and the same vertical axis, said parison moulds taking glass by suction and successively acting for distributing parisons to a single finishing mould, carriages on which each shell of the finishing mould rests respectively, and adjustable screws for exerting on said finishing mould the closing and opening stress.

19. A machine for the manufacture of hollow glass articles of great capacity, comprising a plurality of parison moulds receiving intermittent movements of rotation about one and the same vertical axis, said parison moulds taking glass by suction and successively acting for distributing parisons to a single preparatory mould, in which these parisons are blown in the form of blanks, a single finishing mould receiving said blanks from the preparatory mould, carriages on which rest said preparatory mould and said finishing mould, and adjustable screws for exerting on said preparatory mould and on said finishing mould the closing and opening stress.

20. A machine for the manufacture of hollow glass articles of large capacity, comprising a plurality of parison molds receiving intermittent movements of rotation about one and the same vertical axis, the said parison molds drawing the glass by suction and cooperating successively for delivering parisons to a single finishing mold which receives an opening and closing movement.

EMILE ROIRANT.